March 13, 1962   J. P. ZAWACKI   3,025,034
GATE VALVE
Filed Feb. 15, 1960
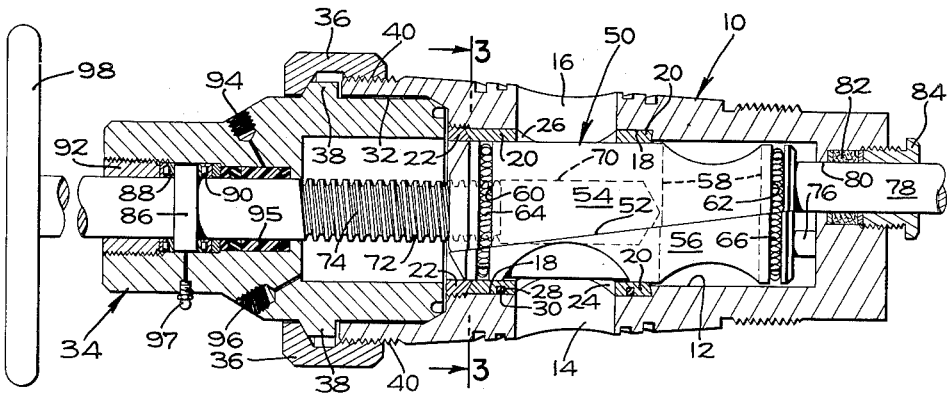
FIG_1
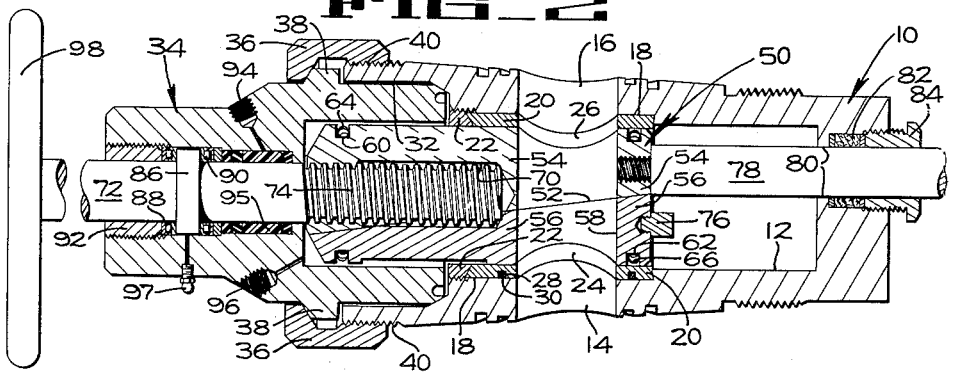
FIG_2
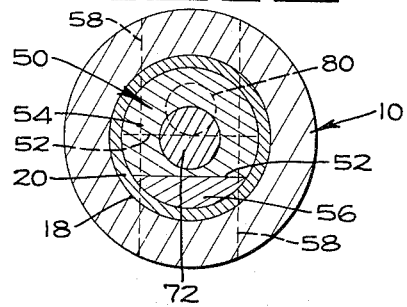
FIG_3
INVENTOR
JOHN P. ZAWACKI
BY Hans F. Hoffmeister
ATTORNEY

United States Patent Office 3,025,034
Patented Mar. 13, 1962

3,025,034
GATE VALVE
John P. Zawacki, Houston, Tex., assignor, by mesne assignments, to FMC Corporation, San Jose, Calif., a corporation of Delaware
Filed Feb. 15, 1960, Ser. No. 8,744
3 Claims. (Cl. 251—190)

The present invention pertains to valves, and more particularly relates to a gate valve adapted to handle fluids under high pressure.

An object of the invention is to provide an improved high pressure gate valve.

Another object of the invention is to provide a gate valve having means to positively seal the same when in closed position to prevent seepage therethrough.

These and other objects and advantages of the present invention will become apparent from the following description and the accompanying drawings, in which:

FIG. 1 is an axial section of the gate valve of the present invention with the gate element thereof shown in elevation and in its closed position.

FIG. 2 is an axial section of the gate valve shown with the gate in section and in its open position.

FIG. 3 is a transverse section along line 3—3 of FIG. 1.

The valve of the present invention comprises a tubular housing 10 having a blind bore 12 formed therein, and inlet and outlet ports 14 and 16, respectively, communicating with the bore 12. The housing 10 is counterbored as indicated at 18 to provide an enlarged portion of the bore 12 at the zone adjacent the inlet and outlet ports 14 and 16. A tubular liner 20 of soft metal is seated within the counterbore 18 and is retained therein by a retaining ring 22 threaded into the end of the counterbore 18. The cylindrical liner 20 is provided with ports 24 and 26 in alignment with the inlet and outlet ports 14 and 16, respectively.

The outer surface of the cylindrical liner 20 is provided with an annular groove 28 encircling and concentric with the port 24. A sealing member 30 within the annular groove 28 seals against the wall of the counterbore 18.

The bore 12 through the housing is further counterbored as indicated at 32 to receive a valve bonnet assembly 34 held in place by a nut 36 which engages an outwardly projecting flange portion 38 of the bonnet assembly 34 and is screwed onto suitable threads 40 provided on the outer surface of the valve housing 10.

A cylindrical gate 50 is slidable within the tubular liner 20. The gate 50 is split longitudinally on a diagonal plane indicated at 52 into two wedge-shaped sections 54 and 56. A passageway 58 is formed diametrically through the cylindrical gate 50 and is adapted to be brought into register with the ports 24 and 26 in the liner to permit flow of fluid from the port 14 to the port 16 as illustrated in FIG. 2, or to be axially moved out of register with the ports 24 and 26 as indicated in FIG. 1 to prevent flow therebetween.

Two peripheral grooves 60 and 62 are formed in the outer surface of the cylindrical gate 50 adjacent the opposite ends thereof. Garter springs 64 and 66 within the grooves 60 and 62, respectively, hold the two sections 54 and 56 of the gate 50 together before the gate 50 is inserted into the housing 10, thus facilitating assembly of the valve. The grooves 60 and 62 are slightly wider than the springs 64 and 66, respectively, with the result that the springs 64 and 66 serve as a lost motion connection between the two gate sections 54 and 56, permitting the section 54 to move axially a short distance while the section 56 remains stationary, and thereafter, if the section 54 continues its longitudinal movement, causing the section 56 to move longitudinally therewith. The left end of the gate member 50 as illustrated in FIGS. 1 and 2 of the drawings, is provided with a blind bore 70 to receive a valve operating stem 72. The outer end of the blind bore 70 which is completely within the section 54 of the gate 50 is internally threaded to engage threads 74 on the stem 72, whereby as the stem 72 is rotated, the gate 50 will be moved to the left or to the right depending upon the direction of rotation of the stem 72. There are no threads in the portion of the bore 70 which is in the gate section 56 as clearly shown in FIG. 2. A stop block 76 is fixed to the right-hand end of the section 56 of the gate 50, and is adapted to abut the blind end of the bore 12 in the valve housing 10 as the gate approaches the limit of its valve-closing movement.

A balance stem 78 is fastened to the right-hand end of the section 54 of the gate 50 and extends through a suitable opening 80 formed in the end of the valve housing 10. A packing 82 surrounds the stem 78 and is held in place by a suitable gland nut 84. It will be noted that the stem 78 is off-center with respect to the axis of the cylindrical gate 50, and thus prevents rotation of the gate 50 when the stem 72 is rotated. The passageway 58 is thus maintained in proper orientation with respect to the ports 14 and 16.

The stem 72 is provided with a peripheral flange 86 which is confined between two thrust bearings 88 and 90 mounted within the bonnet 34. A retaining ring 92 screwed into the bonnet 34 maintains the bearings 88 and 90 in operative position therein to prevent axial movement of the stem 72 without interfering with rotation thereof. A suitable port 94 is provided in the bonnet 34 to permit the injection of fluid or semi-fluid sealing material 95 beneath the thrust bearing 90 to seal around the stem 72 and thus prevent leakage from the housing 10. A second port 96 is provided in the bonnet 34 to permit the injection of suitable grease to lubricate the moving parts of the valve. A grease fitting 97 is provided to permit lubrication of the bearings 88 and 90. A hand wheel 98 is connected to the outer end of the valve stem 72.

To close the valve, the hand wheel 98 is rotated so as to move the gate 50 to the right as viewed in FIGS. 1 and 2. When the stop block 76 abuts the bottom end of the blind bore 12, movement of the portion 56 of the gate 50 is arrested. The portion 54 continues movement and the wedging effect caused by its movement relative to the portion 56 forces the sections 54 and 56 of the valve outwardly against the inner surface of the liner 20 to effectively block and seal the port 24. As mentioned hereinbefore, the slightly greater width of the grooves 60 and 62 than of the garter springs 64 and 66 permits the requisite relative movement between the portions 54 and 56 of the gate 50 to effect this wedging action.

To open the valve the hand wheel 98 is rotated so as to draw the portion 54 of the gate 50 to the left as viewed in FIGS. 1 and 2, thus releasing the wedging force on the two sections of the gate 50. As soon as the wedging force is removed, the garter springs 64 and 66 engage the walls of the grooves 60 and 62, respectively, and move the section 56 of the gate 50 with the section 54 thereof to the left until the passageway 58 is in alignment with the ports 24 and 26 in the liner 20.

While a preferred embodiment of the invention has been disclosed herein, it should be noted that various changes may be made in the construction thereof without departing from the spirit of the invention as defined in the appended claims.

The invention having thus been described, what is claimed and desired to be protected by Letters Patent is:

1. A valve assembly comprising a tubular housing having opposed aligned inlet and outlet ports therein, a tubular liner of soft metal mounted within said housing and having ports therein in register with the inlet and outlet ports in said housing, sealing means disposed between said liner and said housing and around one of said housing ports, a cylindrical gate member slidably mounted within said liner, said gate member having a transverse passage therethrough adapted to be aligned with said inlet and outlet ports to permit fluid flow therebetween or to be moved out of alignment with said ports to control fluid flow therebetween, means associated with said gate member and said housing for preventing relative rotation therebetween, said gate being split longitudinally on an inclined plane into two wedge-shaped arcuate segments, means for stopping one segment prior to the other when said gate is moved toward closed position, and a resilient lost motion connecting means encircling said gate to retain said segments in assembled relation and to permit slight relative longitudinal movement therebetween.

2. A valve assembly comprising a tubular housing having opposed aligned inlet and outlet ports therein, a tubular liner of soft metal mounted within said housing and having ports therein in register with the inlet and outlet ports in said housing, a cylindrical gate member slidably mounted within said liner, said gate member having a transverse passage therethrough adapted to be aligned with said inlet and outlet ports to permit fluid flow therebetween or to be moved out of alignment with said ports to control fluid flow therebetween, means associated with said gate and said housing for preventing relative rotation therebetween, said gate being split longitudinally on an inclined plane into two wedge-shaped arcuate segments, means for stopping one segment prior to the other when said gate is moved toward closed position, said gate having a peripheral groove formed in its outer surface adjacent each end thereof, and a garter spring in each of said grooves to retain said segments in assembled relation and to permit slight relative longitudinal movement therebetween.

3. A valve assembly comprising a tubular housing having opposed aligned inlet and outlet ports therein, a tubular liner of soft metal mounted within said housing and having ports in registry with the inlet and outlet ports of said housing, a cylindrical gate member slidably mounted within said liner, said gate member having a bore in one end thereof and internal threads within the bore, a threaded stem rotatably mounted in said housing and engaging the threads in said gate member, said gate member having a transverse passage therethrough adapted to be aligned with said inlet and outlet ports to permit fluid flow therebetween or to be moved out of alignment with said ports to control said fluid flow, said gate being split longitudinally on an inclined plane into two wedge-shaped arcuate segments, means for stopping one segment prior to the other when said gate is moved toward closed position, a balance stem fixed to one of said segments and projecting through an end of said housing, said balance stem being offset from the axis of said cylindrical gate to prevent rotation thereof within said housing, said gate having a peripheral groove in its outer surface adjacent each end thereof, and resilient means in each of said grooves to retain said segments in assembled relation during slight relative longitudinal movement therebetween.

References Cited in the file of this patent

UNITED STATES PATENTS

| | | |
|---|---|---|
| 1,389,474 | Anderson | Aug. 30, 1921 |
| 2,002,647 | Sorensen | May 28, 1935 |
| 2,161,175 | Laurent | June 6, 1939 |
| 2,758,813 | Anderson | Aug. 14, 1956 |
| 2,772,849 | Davis | Dec. 4, 1956 |